(12) United States Patent
Lien

(10) Patent No.: US 6,611,313 B2
(45) Date of Patent: Aug. 26, 2003

(54) METHOD FOR CHECKING TAPE AUTOMATED BONDING REGION OF DISPLAY MODULE

(76) Inventor: Chun-Hung Lien, No. 580, Kaoshi Rd., Yang-Mei, Taoyuan Shien (TW)

( * ) Notice: Subject to any disclaimer, the term of this patent is extended or adjusted under 35 U.S.C. 154(b) by 195 days.

(21) Appl. No.: 09/903,905

(22) Filed: Jul. 11, 2001

(65) Prior Publication Data

US 2001/0050733 A1 Dec. 13, 2001

(30) Foreign Application Priority Data

Apr. 3, 2001 (TW) .......................................... 90108027 A

(51) Int. Cl.⁷ .............................................. G02F 1/133
(52) U.S. Cl. ........................................ 349/187; 349/150
(58) Field of Search ............................. 349/1, 150, 187, 349/192; 324/754, 755, 770; 269/11, 37

(56) References Cited

U.S. PATENT DOCUMENTS 6,150,833 A * 11/2000 Lin et al. .................... 324/770

* cited by examiner

Primary Examiner—Robert H. Kim
Assistant Examiner—Tai Duong
(74) Attorney, Agent, or Firm—Trojan Law Office

(57) ABSTRACT

A method used in fabricating processes of display modules with various sizes for checking positions of tape automated bonding (TAB) regions on said display modules is provided. The method includes steps of providing a main holder having a holding panel with a size sufficient for suiting the display modules, providing at least two test plates, wherein the test plates and the holding panel have the same peripheral sizes, and the test plates respectively have a hollow portion for suiting the display modules, providing two circuit plates respectively disposed around the first and second hollow portions for suiting the positions of the tape automated regions, and selecting a test plate having a suitable hollow portion for a specific circuit plate and a display module with a specific size in the fabricating process of the display module with the specific size.

12 Claims, 3 Drawing Sheets

METHOD FOR CHECKING TAPE AUTOMATED BONDING REGION OF DISPLAY MODULE

This application claims priority to Taiwan patent application Serial No. 090108027, filed Apr. 03, 2001.

FIELD OF THE INVENTION

The present invention relates to a method for checking tape automated bonding (TAB) regions, and more particularly to a method used in fabricating processes of display modules for checking tape automated bonding regions of the display modules.

BACKGROUND OF THE INVENTION

In the fabricating process of a liquid crystal display module, assembling a printed circuit board is performed after a tape automated bonding (TAB) region provided on a panel of the liquid crystal display. Before assembling the printed circuit board, a checking step performed by a checking machine is necessary for confirming whether the TAB region is in the standard position.

Please refer to FIG. 1. FIG. 1 is a schematic view showing a display module having a screen region 10 and a TAB region 20.

Please refer to FIG. 2. FIG. 2 is a schematic view showing a conventional checking machine for outer lead bonding (OLB). The checking machine includes a main body 1 and a test plate 2. The main body 1 includes a main holder 11 and a transparent or hollow cover 12. A back light source 13 is installed in the main holder 11. The test plate 2 includes a supporting plate 21 and a splint 22. The supporting plate 21 has a circuit plate 23 for the test. Both the supporting plate 21 and the splint 22 both have hollow portions. The hollow portions are used for a beam from the back light source 13 passing through when the display is clipped between the supporting plate 21 and the splint 22.

The circuit plate 23 positioned on the supporting plate 21 could represent the circuit plate, which would be assembled on the display module in the following fabricating process. Hence, the state of electric conduction between the TAB region 20 and the circuit plate 23 is checked to represent the state of the TAB region. The state of electric conduction between the TAB region 20 and the circuit plate 23 is shown on the screen of the display module. Only the display module having the standard TAB region could be assembled with a printed circuit board.

Presently, in the fabrications of display modules with different sizes, a checking machine is specifically designed for a display module with a specific size. For example, a specific checking machine is designed for 14" displays. The 14" display is exposed through the hollow portion 241 of the test plate, and the position of the circuit plate 231 fits the TAB region of the display module as shown in FIG. 3(a). Then, the test plate is placed on 14" main holder for being checked.

Another specific checking machine is designed for 15" displays. Please refer to FIG. 3(b). The 15" display is exposed through the hollow portion 242 of the test plate, and the position of the circuit plate 232 fits the TAB region of the display module. Then, the test plate and the display are placed on 15" main holder for being checked.

However, using various sizes of checking machines for fitting various sizes of display modules increases the cost and takes lots of space.

In order to overcome the foresaid drawbacks, the present invention provides a method used in fabrication processes of display modules for checking positions of tape automated bonding regions of display modules.

SUMMARY OF THE INVENTION

It is therefore an object of the present invention to provide a method for checking positions of tape automated bonding regions of display modules with different sizes by regulating the size of the hollow portion on the test plate for fitting the circuit plate.

It is an aspect of the present invention to provide a method used in fabricating processes of a first display module and a second display module for checking a first and a second positions of tape automated bonding (TAB) regions on the first and second display modules.

In accordance with the present invention, the method includes steps of providing a main holder having a holding panel, providing at least a first test plate and a second test plate, wherein the first test plate, the second test plate and the holding panel have the same peripheral sizes. The first and second test plates respectively have a first hollow portion and a second hollow portion for suiting the first display module and the second display module. A first circuit plate and a second circuit plate are respectively disposed around the first and second hollow portions, placing the first display module on the first test plate, and placing the first display module together with the first test plate on said holding panel of the main holder for checking whether the first position of the tape automated bonding region of the first display module fits a third position of the first circuit plate in the fabricating process of the first display module. And placing the second display module on the second test plate, and placing the second display module together with the second test plate on the holding panel of said main holder for checking whether said second position of the tape automated bonding region of the second display module fits a fourth position of the second circuit plate in the fabricating process of the second display module.

In addition, the method further includes a step of determining whether the tape automated bonding regions fit the circuit plates by viewing test images on displays.

Preferably, the method further includes a step of setting a back light source in the main holder for providing light to the displays.

Preferably, the method further includes a step of providing a cover for covering on the test plates and proving pressure to make the tape automated regions closely contact with the circuit plates when the test plates are put on the holding panel of the main holder.

Preferably, the cover is a transparent cover for facilitating the displays viewed through the transparent cover.

Preferably, the cover is a hollow cover for facilitating the displays viewed through the hollow cover.

It is another aspect of the present invention to provide a method used in fabricating processes of display modules with various sizes for checking positions of tape automated bonding (TAB) regions on the display modules.

In accordance with the present invention, the method includes steps of providing a main holder having a holding panel with a size sufficient for suiting the display modules, providing at least two test plates, wherein the test plates and the holding panel have the same peripheral sizes, and the test plates respectively have a hollow portion for suiting the display modules, providing two circuit plates respectively disposed around the first and second hollow portions for suiting the positions of the tape automated regions, and selecting a test plate having a suitable hollow portion for a specific circuit plate and a display module with a specific size in the fabricating process of the display module with the specific size.

In addition, the method further includes a step of determining whether the tape automated bonding regions fit the circuit plates by viewing test images on screens of the display modules.

Preferably, the method further includes a step of setting a back light source in the main holder for providing light to the screens of the display modules.

Preferably, the method further includes a step of providing a cover for covering on the test plates and proving pressure to make the tape automated regions closely contact with the circuit plates when the test plates are placed on the holding panel of the main holder.

Preferably, the cover is a transparent cover for facilitating the displays viewed through the transparent cover.

Preferably, the cover is a hollow cover for facilitating the displays viewed through the hollow cover.

The present invention may best be understood through the following descriptions with reference to the accompanying drawings, in which:

DETAILED DESCRIPTION OF THE PREFERRED EMBODIMENTS

Figure 1:
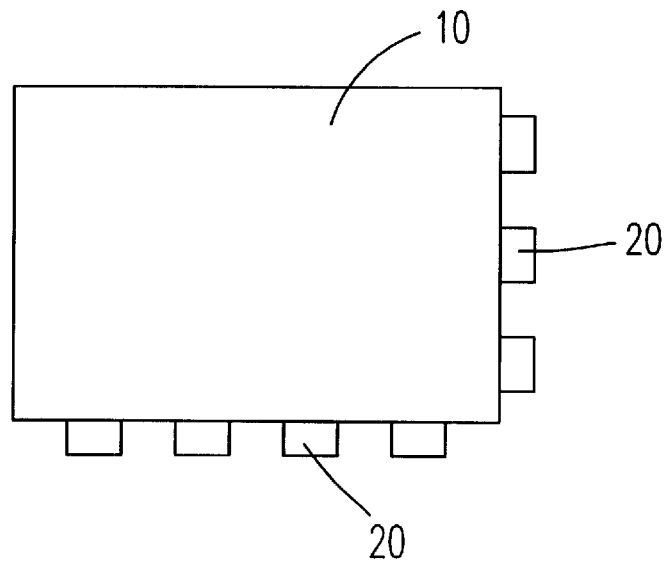
FIG. 1 is a schematic view showing a display module.
Figure 2:
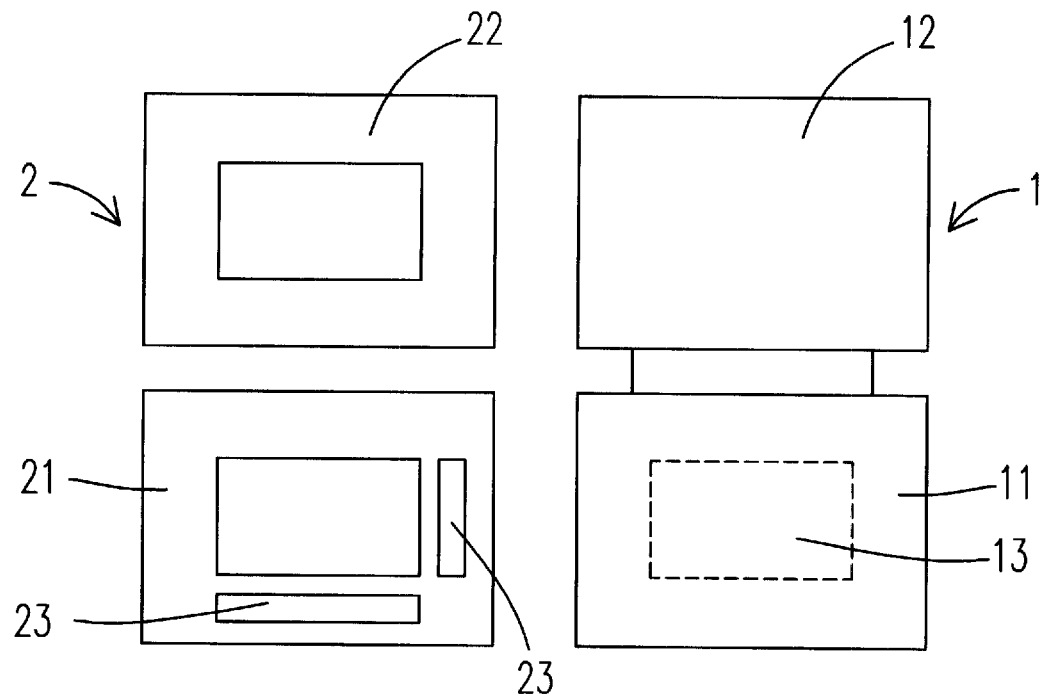
FIG. 2 is a schematic view showing a conventional checking machine for outer lead bonding (OLB)
Figure 3A:
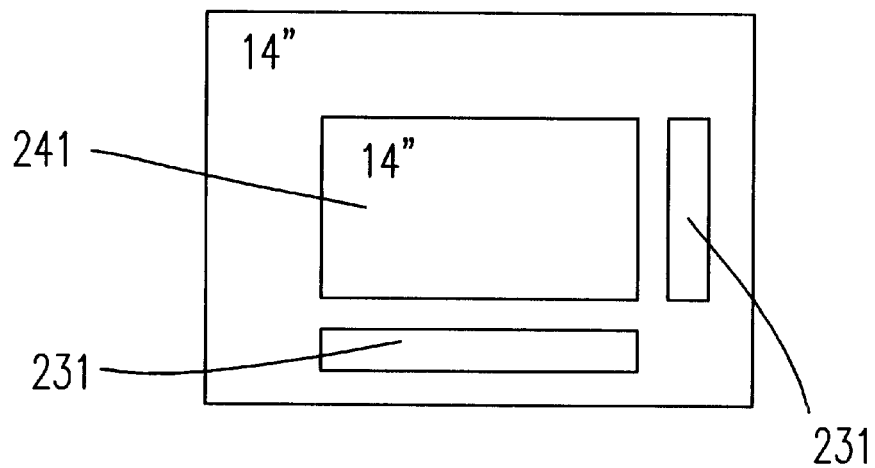
FIG. 3(a) is a schematic view showing the test plate for 14" display modules according to the prior art.
Figure 3B:
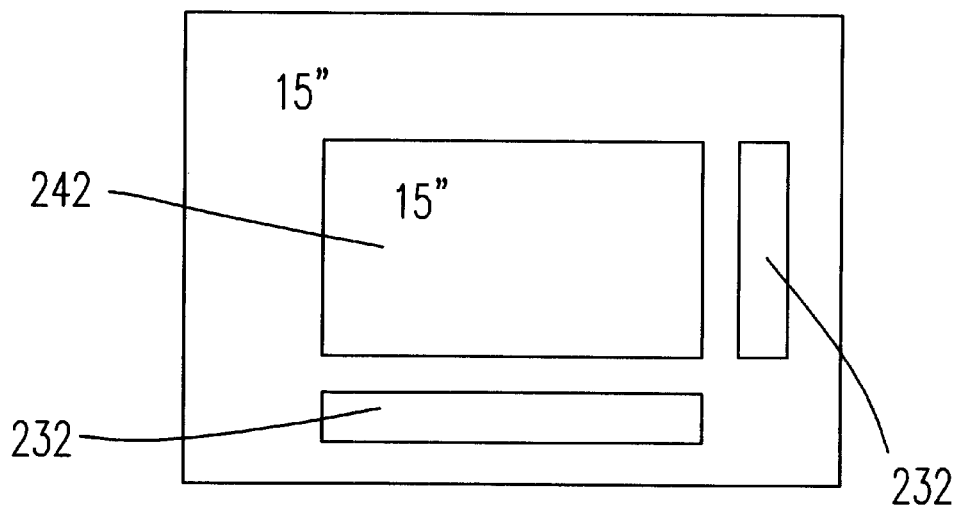
FIG. 3(b) is a schematic view showing the test plate for 15" display modules according to the prior art.
Figure 4:
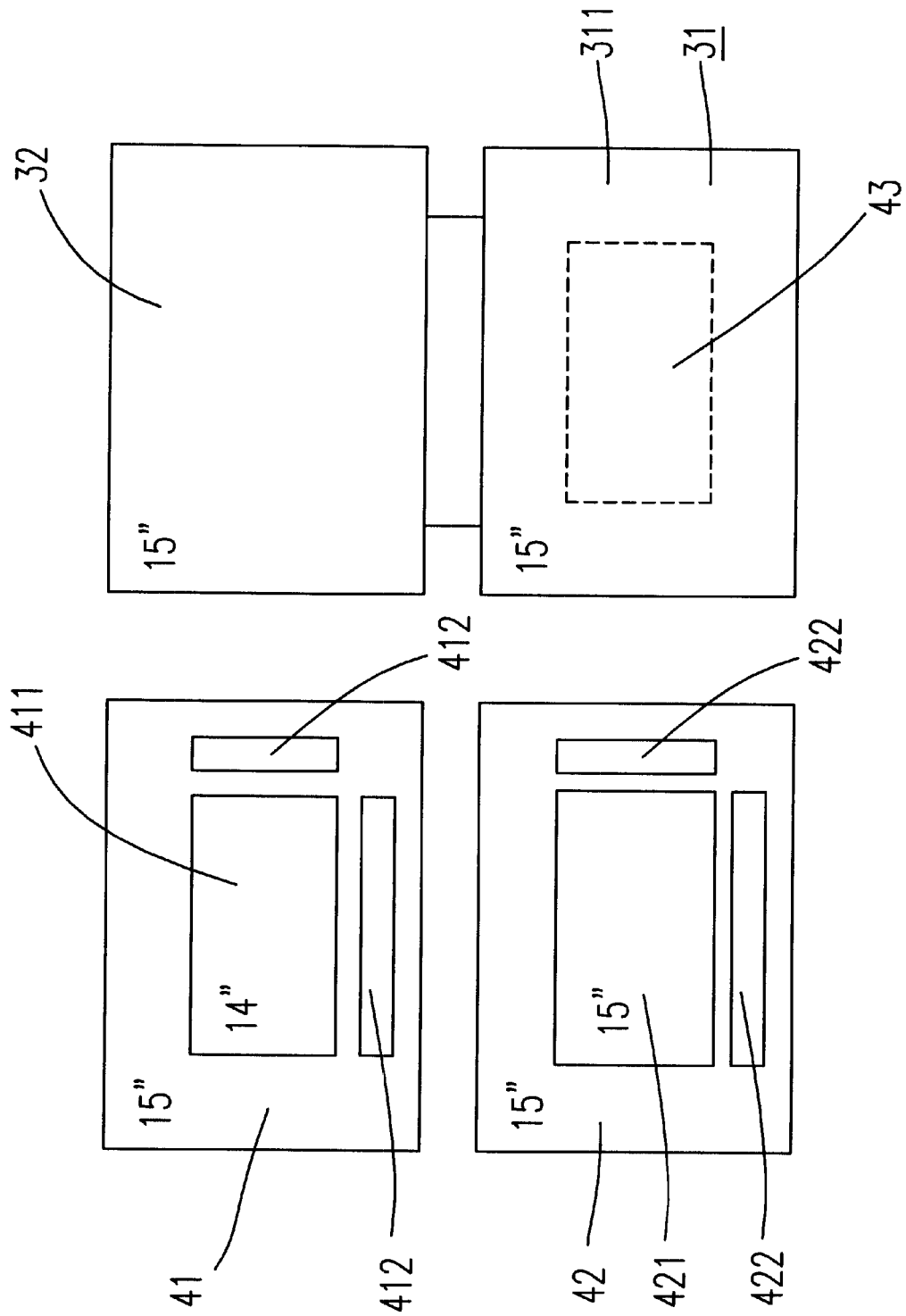
FIG. 4 is a schematic view showing the outer lead bonding checking machine for practicing the method provided by the present invention.

Please refer to FIG. 4. FIG. 4 is a schematic view showing the outer lead bonding checking machine for practicing the method provided by the present invention.

The checking machine includes a main holder 31, a transparent or hollow cover 32, and at least two test plates 41 and 42. The sizes of the main holder 31, the cover 32, the test plates 41 and 42 are fit for the maximal size of screens. For example, when there are 14" and 15" displays fabricated on the production line, the sizes of the main holder 31, the cover 32, the test plates 41 and 42 are all 15". The test plate 41 has a hollow portion 411 for fitting the 14" displays, and a circuit plate 412 is disposed around the hollow portion 411 for suiting the TAB region of the 14" display module. The test plate 42 has a hollow portion 421 for fitting the 15" displays, and a circuit plate 422 is disposed around the hollow portion 421 for suiting the TAB region of the 15" display module.

When 14" display modules are fabricated on the production line, the 14" display modules is clipped in the 14" test plate 41, placed on the holding panel 311 of the main holder 31, and then covered by the cover 32. The back light source 33 inside the main holder 31 is turned on for facilitating the display modules to be checked.

Therefore, the present invention provide a method for checking positions of tape automated regions of display modules with a only one checking machine. The fabrication cost is saved, and the only one checking machine takes less space.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method used in fabricating processes of a first display module and a second display module for checking a first and a second positions of tape automated bonding (TAB) regions on said first and second display modules, comprising steps of:

providing a main holder having a holding panel;

providing at least a first test plate and a second test plate, wherein said first test plate, said second test plate and said holding panel have the same peripheral sizes, said first and second test plates respectively have a first hollow portion and a second hollow portion for suiting said first display module and said second display module, and a first circuit plate and a second circuit plate are respectively disposed around said first and second hollow portions;

placing said first display module on said first test plate, and placing said first display module together with said first test plate on said holding panel of said main holder for checking whether said first position of said tape automated bonding region of said first display module fits a third position of said first circuit plate in said fabricating process of said first display module; and placing said second display module on said second test plate, and placing said second display module together with said second test plate on said holding panel of said main holder for checking whether said second position of said tape automated bonding region of said second display module fits a fourth position of said second circuit plate in said fabricating process of said second display module.

2. The method according to claim 1, further comprising a step of determining whether said tape automated bonding regions fit said circuit plates by viewing test images on displays.

3. The method according to claim 2, further comprising a step of setting a back light source in said main holder for providing light to said displays.

4. The method according to claim 1, further comprising a step of providing a cover for covering on said test plates and proving pressure to make said tape automated regions closely contact with said circuit plates when said test plates are placed on said holding panel of said main holder.

5. The method according to claim 4, wherein said cover is a transparent cover for facilitating said displays viewed through said transparent cover.

6. The method according to claim 4, wherein said cover is a hollow cover for facilitating said displays viewed through said hollow cover.

7. A method used in fabricating processes of display modules with various sizes for checking positions of tape automated bonding (TAB) regions on said display modules, comprising steps of:

providing a main holder having a holding panel with a size sufficient for suiting said display modules;

providing at least two test plates, wherein said test plates and said holding panel have the same peripheral sizes, and said test plates respectively have a first hollow portion and a second hollow portion for suiting said display modules;

providing two circuit plates respectively disposed around said first and second hollow portions for suiting said positions of said tape automated regions; and selecting a test plate having a suitable hollow portion for a specific circuit plate and a display module with a specific size in said fabricating process of said display module with said specific size.

8. The method according to claim 7, further comprising a step of determining whether said tape automated bonding regions fit said circuit plates by viewing test images on displays.

9. The method according to claim 8, further comprising a step of setting a back light source in said main holder for providing light to said displays.

10. The method according to claim 7, further comprising a step of providing a cover for covering on said test plates and proving pressure to make said tape automated regions closely contact with said circuit plates when said test plates are placed on said holding panel of said main holder.

11. The method according to claim 10, wherein said cover is a transparent cover for facilitating said displays viewed through said transparent cover.

12. The method according to claim 10, wherein said cover is a hollow cover for facilitating said displays viewed through said hollow cover.

* * * * *